Patented Apr. 27, 1948

2,440,356

UNITED STATES PATENT OFFICE 2,440,356

PROCESS AND CULTURE MEDIA FOR THE PRODUCTION OF PENICILLIN

Otto K. Behrens, Indianapolis, Ind., assignor to Eli Lilly and Company, Indianapolis, Ind., a corporation of Indiana No Drawing. Application August 24, 1945, Serial No. 612,526

8 Claims. (Cl. 195—36)

This invention relates to penicillin and more particularly to improvements in the production thereof.

An object of this invention is to provide a process whereby the production and yield of penicillin may be improved. Other objects will be apparent from the disclosures herein made.

Penicillin, a material produced by a Penicillium mold of the notatum-chrysogenum group, has become widely known within recent years for its remarkable therapeutic properties as an antibacterial agent.

The availability of penicillin has been retarded by the circumstances of its production. The penicillin formed, presumably as a metabolic product, by the growth of the mold under suitable conditions, has been produced slowly and in very small quantity. Furthermore, the mold has produced other products, chemically similar to penicillin, but without potent antibacterial properties. Thus the small quantity of penicillin and the presence of structurally similar compounds has rendered its isolation difficult.

One of the methods which has been employed commercially for the production of penicillin is that known as surface culture. In a common adaptation of this method a liquid nutrient medium is supplied to a large number of bottles which are supported in a substantially horizontal position. The nutrient medium is then inoculated with the Penicillium mold and the mold grows on the surface of the nutrient medium. In order to produce commercial quantities of penicillin by this method a large number of bottles is required and individual handling is necessary.

Another process which has been commercialized to some extent is that known as the bran process wherein Penicillium mold is grown on bran. The bran may be spread in thin layers on trays or may be agitated continuously in rotating drums. While the bran itself is a nutrient for the growth of the mold, it is common to associate additional nutrient materials therewith.

Probably the most widely used process at the present time for the production of penicillin is that ordinarily referred to as submerged or deep culture. The submerged culture process involves the growth of Penicillium mold in an aqueous nutrient medium and accompanied customarily by agitation. When the submerged culture process is carried out in small vessels such as flasks of relatively small capacity, the process is frequently referred to as the "shake" culture process because the agitation is brought about by continuously shaking the culture by suitable mechanical means. When containers of larger capacity are employed, and such containers may have capacities running into the thousands of gallons, the agitation of the liquid nutrient medium is ordinarily accomplished in part by mechanical stirring and in part by aeration, which latter functions primarily to supply oxygen for the growth of the mold.

All of the above processes have been characterized in general by the slow production, and low yield, of penicillin.

By my invention the production of penicillin by a Penicillium mold of the notatum-chrysogenum group may be accelerated and the yield of penicillin increased.

According to the present invention penicillin is produced by growing a Penicillium mold of the notatum-chrysogenum group in a culture medium in the presence of a compound represented by the formula

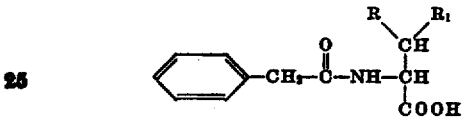

and the salts and lower alkyl esters thereof, wherein R represents a member of the group consisting of hydrogen, methyl and ethyl and $R_1$ represents methyl or ethyl. According to a preferred method the Penicillium mold and one or more of the phenylacetylated α-amino acids as described above are associated with an aqueous culture medium containing nutrient material suitable for the growth and development of the mold, and the mold is grown under penicillin-producing conditions. The phenylacetylated α-amino acid of the particular group described above is incorporated in the nutrient material in effective amount less than about 1 percent, and preferably less than about 0.3 percent. The amount of material which accelerates the production of penicillin may accordingly be present in relatively small amount although over a substantial range. For example, the method has been effectively carried out by associating about 0.02 percent of N-phenylacetyl-valine and the Penicillium mold with a culture medium containing mold-growth-supporting material, and under similar circumstances there has been satisfactorily employed about 0.01 percent of the optical isomer of N-phenylacetylvaline having the l-configuration of the molecule. Even smaller amounts have proven effective.

In another aspect there is provided by this invention a culture medium comprising mold-growth-supporting material and a phenylacetylated compound as set forth in the next preceding paragraph. In a preferred form the culture medium may comprise water, mold-growth-supporting material, and, in amount effective to accelerate the production of penicillin and less than about 1 percent and preferably less than about 0.3 percent, a compound as described above. The amount of the compound which accelerates the production of penicillin may vary substantially throughout the range indicated above. By way of example the culture medium may contain about 0.02 percent of N-phenylacetylvaline or about 0.01 percent of the optical isomer of N-phenylacetylvaline having the l-configuration of the molecule.

The effective form of the compound employed in carrying out either aspect of the invention is the isomer having the l-configuration of the molecule. For equal effectiveness therefore, the dl or racemic mixture of the compound may be employed in amount preferably about twice that of the l-isomer.

The phenylacetylated compounds employed in this invention are novel per se and are disclosed in detail and claimed in copending application Serial No. 612,524, filed August 24, 1945.

The invention will now be described in detail in its present preferred application to the submerged culture process of producing penicillin.

In the submerged culture process the culture medium comprises water and mold-growth-supporting material. The nutrient material may consist of ingredients known to those skilled in the art. A prominent constituent of one type of suitable nutrient is that known as corn steep solids which is a by-product obtained in the manufacture of corn starch. Corn steep solids is a desirable material because of its low cost and its effectiveness in bringing about a relatively high yield of penicillin. On the other hand corn steep solids is of indeterminate chemical composition, some ingredients of which may make more difficult the isolation of the penicillin produced during the growth of the mold. With a major constituent such as corn steep solids there are ordinarily associated additional ingredients known to the art such as corn sugar, lactose, and salts such as calcium carbonate and zinc sulfate. The exact function of the various ingredients is not known in detail, but it is known to those skilled in the art that the combination of such ingredients does bring about the production of penicillin when a Penicillium mold of the notatum-chrysogenum group is grown in such a culture medium under suitable conditions.

Another type of aqueous culture medium includes water and nutrient substances which, as contrasted with corn steep solids, are of a determinate chemical composition. Such ingredients include lactose, dextrose, acetic acid and salts such as sodium nitrate, ammonium nitrate, potassium dihydrogen phosphate, and magnesium sulfate. Compositions of this type are advantageous in that penicillin frequently is more readily separated from the other constituents of the culture medium and other products of the growth of the mold.

The mold employed for the production of penicillin is a Penicillium mold of the notatum-chrysogenum group, and illustratively a strain of this mold suitable for the purpose of this invention is that known as strain N. R. R. L. 1976.

The compounds which may be employed for the purposes of this invention to accelerate the production of penicillin and which come within the scope of the structural formula given above include N-phenylacetylvaline, N-phenylacetylisoleucine, N-phenylacetyl-$\alpha$-amino-n-butyric acid, N-phenylacetyl-$\beta$, $\beta$-diethylalanine and N-phenylacetylnor-valine.

These compounds may be employed in the form of the free acids and also in the form of their salts such as the sodium, potassium, magnesium, ammonium and substituted ammonium salts, as well as in the form of their lower alkyl esters such as the methyl, ethyl and propyl esters.

The activity of the above compounds for the purposes of this invention appears to be attributable to the isomeric form of the compound possessing the l-configuration of the molecule. Thus in practice there may be employed the dl or racemic mixture of the compound, or the l-form of the compound. It is frequently simpler to employ the racemic or dl mixture of the compound rather than to separate and use the purified l-form. The amount of dl-compound required for the same result in the practice of the invention is about twice that of the l-form.

The amounts of the phenylacetyl compounds employed in carrying out this invention may vary to a substantial extent. In general the effective amounts for the racemic or dl mixture of the phenylacetyl compound ranges up to about 10 grams per liter of culture medium or in other words up to about 1 percent on a weight-volume basis, although generally it is preferred to employ the phenylacetyl compound in amounts less than about 0.3 percent. The present optimum range for use with compounds having the l-configuration of the molecule is about 0.01 to 0.02 percent. In general there is no particular advantage to be gained by employing amounts of the phenylacetyl compounds in substantial excess of the amounts effective in promoting the production of penicillin by the mold.

The phenylacetyl compound may be associated with the mold and culture medium at any suitable time. Thus the materials of the culture medium upon association in a suitable container may be inoculated with the Penicillium mold and the phenylacetyl compound may be incorporated either before or shortly after the inoculation with the mold.

The culture medium, with the mold, and the compound accelerating the production of penicillin, should be maintained at a suitable temperature, for example in the range of 20–30° C. A range of temperature which has been found to be particularly suitable is from 24–28° C. The period of time during which the mold is grown will depend upon the objective desired. Thus the mold may be grown only during the period of its maximum rate of growth. Under such conditions the mold growth may be interrupted after a period of growth of from two to three days. On the other hand the mold may be grown to obtain the maximum yield of penicillin. In such case the mold may be grown for a longer period, for example for about four or five days.

The penicillin may be separated from the culture medium in any suitable manner. For example the penicillin may be adsorbed on a surface-active carbon. Alternatively the penicillin may be extracted by means of a suitable water-immiscible organic solvent such as amyl acetate. By well-known extractive procedures, the penicillin subsequently may be isolated in dry form as a salt thereof, for example the sodium or calcium salt.

By the practice of this invention the yield of penicillin has been substantially increased. Thus under comparative conditions the yield of penicillin has been increased from 50 to upwards of 80 percent. This range is of course illustrative and lesser or greater yields are within the contemplation of the invention depending upon the conditions under which the penicillin is produced.

Specific examples further illustrating the invention particularly with respect to the deep culture process of producing penicillin are given below.

*Example 1*

A culture medium was prepared comprising the following constituents:

| | | |
|---|---|---|
| Corn steep solids | pounds | 500 |
| Corn sugar | do | 125 |
| Lactose | do | 500 |
| Calcium carbonate | do | 50 |
| Zinc sulfate heptahydrate | do | 1.0 |
| Water | gallons | 3,000 |

To the above culture medium were added four pounds of N-phenylacetylvaline equivalent on a weight-volume basis to 0.02 precent. The culture medium was inoculated with a Penicillium mold, strain N. R. R. L. 1976, and the mold was allowed to grow for 4¼ days at 27° C. The penicillin produced in the above culture medium amounted to 110 Oxford units per cc. of culture medium.

By way of comparison, a Penicillium mold of the same strain grown in the same culture medium under the same conditions including time and temperature as above except in the absence of the N-phenylacetylvaline, produced penicillin to the extent of only 76 Oxford units per cc. of culture medium.

From the above it will be seen that an increase in production of penicillin to the extent of 55 percent was accomplished in carrying out the production of penicillin in accordance with this invention.

*Example 2*

A culture medium was prepared as follows:

| | | |
|---|---|---|
| Lactose | grams | 35 |
| Corn steep solids | do | 20 |
| Calcium carbonate | do | 2 |
| Zinc sulfate heptahydrate | do | 0.004 |
| M/50 phosphate buffer | cc | 5 |
| Water, q. s | cc | 1,000 |

0.1 g. of N-phenylacetylvaline, namely 0.01 percent on a weight-volume basis, were added to the culture medium and the medium was inoculated with a Penicillium mold, strain N. R. R. L. 1976. The culture medium and mold were agitated continuously and the mold was permitted to grow for four days at 27° C. There was obtained penicillin to the extent of 129 Oxford units per cc. of culture medium.

By way of comparison, when the Penicillium mold was grown under the same conditions but in the absence of the N-phenylacetylvaline the yield of penicillin was 112 Oxford units per cc. of culture medium.

*Example 3*

With a culture medium and under conditions the same as those described in Example 2, an amount of N-phenylacetylvaline was added to the extent of 0.2 g., namely, 0.02 percent on a weight-volume basis. Under such conditions the yield of penicillin was 195 Oxford units per cc. of culture medium, which it will be observed is an increase of 75 percent over the amount produced when no N-phenylacetylavine was employed.

*Example 4*

With a culture medium the same as that described in Example 2, an amount of N-phenylacetylvaline was added to the extent of 0.4 g., namely, 0.04 percent on a weight-volume basis. After growth of the mold for 5 days, the amount of penicillin was 182 Oxford units per cc. of culture medium. This represented an increase of 63 percent over the amount produced when no N-phenylacetylvaline was employed.

In the above examples "corn steep solids" has been included as a constituent of the culture medium. Corn steep solids assists in the obtaining of high yields of penicillin, but due in part to the heterogeneous nature of corn steep solids difficulty is involved in the separation of penicillin from other constituents of the culture medium following the growth of the mold.

In the examples to follow the culture media do not contain corn steep solids and are of more precise chemical composition. The employment of such culture media may result in the production of a lower yield of penicillin. On the other hand penicillin which is produced may be considerably more readily separated from the culture media following the growth of the mold.

*Example 5*

A culture medium of the following composition was prepared:

| | | |
|---|---|---|
| Water | cubic centimeters | 1,000 |
| Lactose | grams | 25.0 |
| Dextrose | do | 5.0 |
| Sodium nitrate | do | 5.0 |
| Ammonium nitrate | do | 5.0 |
| Potassium dihydrogen phosphate | do | 1.0 |
| Magnesium sulfate | do | 0.25 |
| Acetic acid | do | 5.0 |

0.2 g. of N-phenylacetylvaline, namely 0.02 percent on a weight-volume basis were added for the purposes of this invention and the culture medium inoculated with Penicillium mold strain N. R. R. L. 1976. The entire composition was mechanically agitated and maintained at a temperature of about 27° C. for six days. At this time the penicillin had been produced to the extent of about 80 Oxford units per cc. of culture medium.

By way of comparison a medium containing no N-phenylacetylvaline but otherwise the same and maintained under the same conditions for six days produced penicillin to the extent of a concentration of only 54 Oxford units per cc. of culture medium.

*Example 6*

Another example of a culture medium not embodying corn steep solids is as follows:

| | | |
|---|---|---|
| Potassium dihydrogen phosphate | grams | 1.0 |
| Dipotassium hydrogen phosphate | do | 1.0 |
| Magnesium sulfate heptahydrate | do | 1.0 |
| Sodium nitrate | do | 2.0 |
| Lactose | do | 10.0 |
| Zinc sulfate heptahydrate | do | 0.01 |
| Water q. s. | cubic centimeters | 2,000 |

(Adjusted to pH 6.5 with NaOH solution.)

N-phenylacetylvaline was incorporated in the above culture medium to the extent of about 0.02 percent and the medium inoculated with the N. R. R. L. 1976 strain Penicillium mold. The composition was mechanically agitated for three days and maintained at a temperature of about 27° C. The penicillin was then found to be present to the extent of 36 Oxford units per cc. of culture medium.

By way of comparison under the same conditions except for the absence of N-phenylacetylvaline the penicillin production was only 26 Oxford units per cc. of culture medium.

The following examples further illustrate this invention:

Example 7

To a culture medium as shown in the table in Example 2 were added 0.02 percent on a weight-volume basis of 1-N-phenylacetylvaline and the medium was inoculated with Penicillium mold strain N. R. R L 1976. The inoculated culture medium was mechanically agitated for four days at 27° C. There was obtained penicillin to the extent of 183 Oxford units per cc. of culture medium.

By way of comparison when the Penicillium mold was grown under the same conditions but in the absence of the 1-N-phenylacetylvaline the yield of penicillin was 110 Oxford units per cc. of culture medium.

Example 8

To a culture medium as shown in the table in Example 5 were added 0.02 percent on a weight-volume basis of 1-N-phenylacetylvaline and the medium was inoculated with Penicillium mold strain N. R. R. L. 1976. The mold was permitted to grow in the above culture medium which was mechanically agitated for three days at a temperature of about 27° C. There was obtained penicillin to the extent of 36 Oxford units per cc. of culture medium.

By way of comparison when the Penicillium mold was grown under the same conditions but in the absence of 1-N-phenylacetylvaline the yield of penicillin was 24 Oxford units per cc. of culture medium.

Example 9

To a culture medium as shown in the table in Example 2 were added 0.02 percent on a weight-volume basis of N-phenyl-acetylnor-valine and the medium was inoculated with Penicillium mold strain N. R. R. L. 1976. The mold was permitted to grow in the above culture medium which was mechanically agitated for four days at 27° C. There was obtained penicillin to the extent of 1433 Oxford units per cc. of culture medium.

By way of comparison when the Penicillium mold was grown under the same conditions but in the absence of the N-phenyl-acetylnor-valine the yield of penicillin was 87 Oxford units per cc. of culture medium.

Example 10

To a culture medium as shown in the table in Example 6 there were added 0.02 percent of N-phenylacetylnor-valine on a weight-volume basis and the culture medium was inoculated with Penicillium mold strain N. R. R. L. 1976. The mold and culture medium were mechanically agitated and mold growth continued for three days at a temperature of about 27° C. The penicillin was found to be present to the extent of 32 Oxford units per c. of culture medium.

By way of comparison under the same conditions except for the absence of N-phenylacetyl-nor-valine penicillin was produced to the extent of 24 Oxford units per cc. of culture medium.

Example 11

To a culture medium as shown in the table in Example 6 there were added 0.02 percent on a weight-volume basis of N-phenylacetylisoleucine and the culture medium was inoculated with Penicillium mold strain N. R. R. L. 1976 and subjected to mechanical agitation. The mold was permitted to grow for three days at about 27° C. There was obtained penicillin to the extent of 36 Oxford units per cc. of culture medium.

In the above culture medium except for the absence of N-phenylacetylisoleucine there was obtained under the same conditions a concentration of 24 Oxford units of penicillin per cc. of culture medium.

Example 12

To a culture medium as shown in the table in Example 6 there were added 0.02 percent on a weight-volume basis of N-phenylacetyl-$\beta,\beta$-diethylalanine and the culture medium was inoculated with Penicillium mold strain N. R. R. L. 1976. The mold was permitted to grow in a culture medium for three days at about 27° C. There was obtained penicillin to the extent of 24 Oxford units per cc. of culture medium.

By way of comparison under the same conditions but in the absence of N-phenylacetyl-$\beta,\beta$-diethylalanine there was produced penicillin to the extent of 18 Oxford units per cc. of culture medium.

Example 13

To a culture medium as shown in the table in Example 6 there were added 0.02 percent on a weight-volume basis of N-phenylacetyl-$\alpha$-amino-n-butyric acid and the culture medium was inoculated with Penicillium mold strain N. R. R. L. 1976. The mold and culture medium were mechanically agitated and growth continued for three days at about 27° C. There was obtained penicillin to the extent of 29 Oxford units per cc. of culture medium.

By way of comparison when the Penicillium mold was grown under the same conditions but in the absence of N-phenylacetyl-$\alpha$-amino-n-butyric acid the yield of penicillin obtained was 24 Oxford units per cc. of culture medium.

Example 14

To a culture medium as shown in the table in Example 6 were added 0.02 percent of N-phenylacetylvaline methyl ester and the culture medium was inoculated with Penicillium mold strain N. R. R. L. 1976. The mold and culture medium were mechanically agitated and the mold grown for three days at about 27° C. There was obtained penicillin to the extent of 28 Oxford units per cc. of culture medium.

By way of comparison when Penicillium mold was grown under the same conditions but in the absence of N-phenylacetylvaline methyl ester the yield of penicillin was 20 Oxford units per cc. of culture medium.

As previously mentioned, compounds to be employed in carrying out this invention are novel and their preparation is disclosed in copending application Serial No. 612,524, filed August 24, 1945. For purposes of convenience, preparation of certain of these compounds is given below:

Preparation of N-phenylacetylvaline

N-phenylacetylvaline represented by the following formula

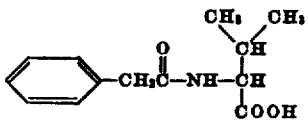

may be prepared as follows:

To a solution of 200 g. of valine in 200 cc. of water and 450 cc. of 5 N sodium hydroxide solution, there are added with stirring 293 cc. of phenylacetylchloride while maintaining the temperature below 25° C. The addition is carried out over a period of two hours and when the bulk of the phenylacetyl chloride has been added, the reaction mixture is tested from time to time and kept alkaline by the addition of small quantities of sodium hydroxide solution. After all the phenylacetyl chloride has been added, the solution is stirred for an additional 45 minutes to complete the reaction. The reaction mixture is then filtered, acidified with about 400 cc. of 6 N hydrochloric acid solution and cooled to about 0° C. whereupon the N-phenylacetylvaline crystallizes. The crystals are filtered off, washed with cold water and dried. The crude N-phenylacetylvaline thus obtained is suspended in one liter of 50 percent ethylene dichloride - petroleum ether mixture, stirred well, filtered and washed with an additional 500 cc. of ethylene dichloride-petroleum ether mixture. N-phenylacetylvaline thus prepared has been found to melt at about 112–114° C.; and a micro-Dumas analysis has shown the presence of 6.04 percent nitrogen as compared with a calculated value of 5.96 percent.

Preparation of 1-N-phenylacetylvaline

1-N-Phenylacetylvaline may be prepared by chemical resolution by means of the brucine salt of N-phenylacetylvaline prepared according to the method described under "Preparation of N-phenylacetylvaline." To a solution of 23.5 g. of N-phenylacetylvaline in 50 cc. of methanol is added a solution of 46.7 g. of brucine in 100 cc. of methanol and the mixture allowed to evaporate at room temperature. The residue is dissolved in about 450 cc. of hot water and from the hot solution upon cooling there separate colorless needles of the brucine salt of 1-N-phenylacetylvaline melting at about 105–108° C. This salt is recrystallized five times from water whereupon there is obtained a purified salt melting at about 105° C. and having about the following optical rotation in 2 percent absolute ethanol solution:

$$[\alpha]_D^{29.5°} = -9.0°$$

14 g. of this purified brucine salt of 1-N-phenylacetylvaline are suspended in 100 cc. of water and treated with an excess of dilute sodium hydroxide solution until the mixture becomes alkaline. The precipitated brucine is filtered off and the filtrate acidified by treatment with hydrochloric acid, whereupon 1-N-phenylacetylvaline precipitates. The 1-N-phenylacetylvaline when recrystallized twice from dilute alcohol melts at about 139–140° C. and has about the following optical rotation in 4 percent absolute ethanol solution:

$$[\alpha]_D^{29.7°} = +9.75°$$

Preparation of methyl ester of N-phenylacetylisoleucine

The methyl ester of N-phenylacetylisoleucine represented by the following formula

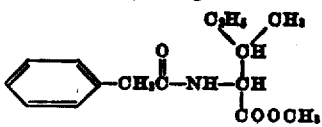

may be prepared as follows:

18 g. of isoleucine methyl ester hydrochloride are dissolved in a minimum amount of water, the solution cooled to 0° C. and several volumes of ether added. To the solution are then added 10 g. of 40 percent sodium hydroxide solution with cooling and shaking. Solid anhydrous potassium carbonate is then added until the aqueous phase is converted to a paste and the ethereal solution which contains isoleucine methyl ester is separated. The aqueous paste is then extracted twice with ether, the ether extracts added to the original extract, and the combined extracts dried with anhydrous magnesium sulfate. To the dry ether solution are added 7 g. of phenylacetyl chloride in portions, and after this addition is completed, 7 g. of phenylacetyl chloride and 50 cc. of 10 percent sodium carbonate are added in small portions. The ether layer is then washed successively with dilute hydrochloric acid solution and sodium bicarbonate solution and is dried over anhydrous magnesium sulfate. The dried ether solution freed from the magnesium sulfate upon evaporation yields the methyl ester of N-phenylacetylisoleucine.

Preparation of N-phenylacetyl-α-amino-n-butyric acid

N-phenylacetyl-α-amino-n-butyric acid represented by the following formula

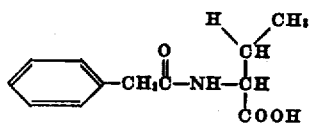

may be prepared from phenylacetyl chloride and α-amino-n-butyric acid by a method similar to that used for the preparation of N-phenylacetylvaline described in "Preparation of N-phenylacetylvaline." N-phenylacetyl-α-amino-n-butyric acid thus prepared has been found to melt at about 124–126° C.; and a micro-Dumas analysis has shown the presence of 6.44 percent nitrogen as compared with a calculated value of 6.33 percent.

Preparation of N-phenylacetyl-β, β-diethylalanine

N-phenylacetyl-β, β-diethylalanine represented by the following formula

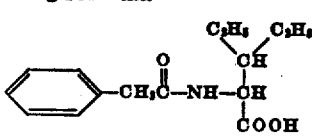

may be prepared as follows:

To a mixture of 42 g. of ammonium chloride, 31.5 g. of sodium cyanide and 120 cc. of methanol, 24.4 g. of α-ethyl-butyraldehyde are added slowly with stirring over a period of one half hour. Stirring is continued one hour longer and the mixture is then refluxed with stirring for four hours. The solution is then cooled, 120 cc. of ether are added and the mixture filtered. To the filtrate 120 cc. of concentrated hydrochloric acid are added over a period of one hour. During this addition hydrogen cyanide is liberated. To the acidified mixture, 120 cc. of water are added and the mixture evaporated to remove all of the ether and most of the water. To the residue are added 30 cc. of concentrated hydrochloric acid and the solution refluxed for 10 hours. The resulting solution after evaporation to dryness in vacuo is treated with 30 cc. of water and the evaporation in vacuo repeated. The residue is suspended in 10 cc. of water, and 150 cc. of 95 percent ethyl alcohol added, whereupon sodium chloride is precipitated and removed by filtration. 40 cc. of aniline are then added to the filtrate and the mixture cooled to about 0° C. for 10 to 12 hours. $\beta,\beta$-Diethylalanine precipitates from the solution in crystalline form. The crystals are purified by washing them with absolute alcohol and ether.

The $\beta,\beta$-diethylalanine is converted into N-phenylacetyl-$\beta,\beta$-diethylalanine by treatment with phenylacetyl chloride by substantially the same method used for the preparation of N-phenylacetylvaline described in "Preparation of N-phenylacetylvaline." N-phenylacetyl-$\beta,\beta$-diethylalanine thus prepared has been found to melt at about 98–100° C.; and a micro-Dumas analysis has shown the presence of 5.6 percent nitrogen as compared with a calculated value of 5.3 percent.

*Preparation of N-phenylacetylnor-valine*

N-phenylacetylnor-valine represented by the formula

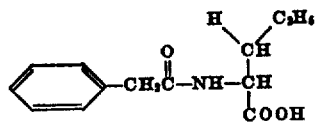

may be prepared by reacting nor-valine with phenylacetyl chloride in the presence of aqueous alkali by the method used for the preparation of N-phenylacetylvaline described in "Preparation of N-phenylacetylvaline."

N-phenylacetylnor-valine has been found to melt at about 136–138° C.; and a micro-Dumas analysis has shown the presence of 5.95 percent nitrogen as compared with the calculated value of 5.96 percent.

*Preparation of N-phenylacetylisoleucine*

N-phenylacetylisoleucine represented by the formula

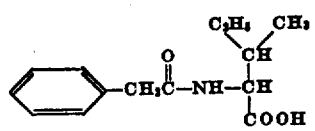

may be prepared by reacting isoleucine with phenylacetyl chloride in the presence of aqueous alkali by the method used for the preparation of N-phenylacetylvaline described in "Preparation of N-phenylacetylvaline."

N-phenylacetylisoleucine has been found to melt at about 108–109° C.; and a micro-Dumas analysis has shown the presence of 5.45 percent nitrogen as compared with a calculated value of 5.62 percent.

Having thus described my invention, what I claim as new and desire to secure by Letters Patent of the United States is:

1. The method of producing penicillin in submerged culture which comprises growing a Penicillium mold of the notatum-chrysogenum group in a culture medium in the presence of an effective amount less than about one percent of a compound characterized by the presence of its 1-configuration isomer and selected from the class consisting of acids represented by the formula

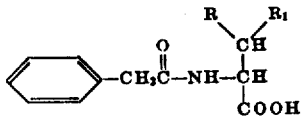

wherein R represents a member of the group consisting of hydrogen, methyl and ethyl and $R_1$ represents an alkyl radical having not more than two carbon atoms, and salts and lower alkyl esters of said acids.

2. The improved method of obtaining penicillin in submerged culture which comprises providing an aqueous culture medium for the growth and development of a Penicillium mold of the notatum-chrysogenum group, associating with said culture medium a Penicillium mold of the notatum-chrysogenum group and an effective amount less than about one percent of a compound characterized by the presence of its 1-configuration isomer and selected from the class consisting of phenylacetylated $\alpha$-amino acids represented by the formula

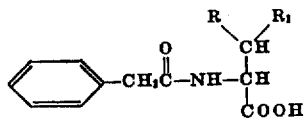

wherein R represents a member of the group consisting of hydrogen, methyl and ethyl and $R_1$ represents an alkyl radical having not more than two carbon atoms, and salts and lower alkyl esters of said acids; and growing the mold.

3. In the method of producing penicillin in submerged culture by growing a Penicillium mold of the notatum-chrysogenum group in association with a nutrient material, the improvement which comprises incorporating in the nutrient material, in effective amount less than about 1 percent, a compound characterized by the presence of its 1-configuration isomer and selected from the class consisting of phenylacetylated $\alpha$-amino acids represented by the formula

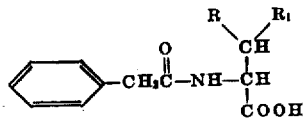

wherein R represents a member of the group consisting of hydrogen, methyl and ethyl and $R_1$ represents an alkyl radical having not more than two carbon atoms; and the salts and lower alkyl esters of said acids.

4. The improved method of producing penicillin in submerged culture which comprises providing a culture medium containing nutrient material and associating with said culture medium a Penicillium mold of the notatum-chrysogenum group and about 0.02 percent of N-phenylacetylvaline characterized by the presence of its 1-configuration isomer.

5. The improved method of producing penicillin in submerged culture which comprises providing a culture medium containing a nutrient material and associating with said culture medium a Penicillium mold of the notatum-chrysogenum group and about 0.01 percent of N-phenacetylvaline having the 1-configuration of the molecule.

6. A culture medium for the production of penicillin in submerged culture through the growth of a Penicillium mold of the notatum-chrysogenum group, said culture medium comprising nutrient material and an effective amount less than about one percent of a compound characterized by the presence of its 1-configuration isomer and selected from the class consisting of acids represented by the formula

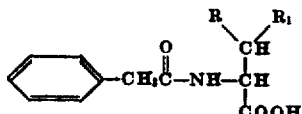

wherein R represents a member of the group consisting of hydrogen, ethyl and methyl and $R_1$ represents an alkyl radical having not more than two carbon atoms; and the salts and lower alkyl esters of said acids.

7. A culture medium for the production of penicillin in submerged culture through the growth of a Penicillium mold of the notatum-chrysogenum group, said culture medium comprising water, nutrient material and, in amount effective to accelerate the production of penicillin and less than about 1 percent, a compound characterized by the presence of its 1-configuration isomer and selected from the class consisting of acids represented by the formula

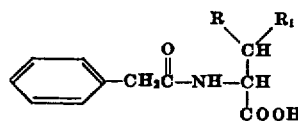

wherein R represents a member of the group consisting of hydrogen, ethyl and methyl and $R_1$ represents an alkyl radical having not more than two carbon atoms; and the salts and lower alkyl esters of said acids.

8. A culture medium for the production of penicillin in submerged culture through the growth of a Penicillium mold of the notatum-chrysogenum group, said culture medium comprising water, nutrient material dispersed in said water, and about 0.01 percent of N-phenylacetylvaline having the 1-configuration of the molecule.

OTTO K. BEHRENS.

REFERENCES CITED

The following references are of record in the file of this patent:

Coghill, Monthly Progress Report No. 16, November 20, 1943, Distributed by Committee on Medical Research, O. S. R. D., pages 1 and 2.

Pennsylvania State College Penicillin Interim Report (45-124), March 30, 1945, page 1.

Coghill, Monthly Progress Report No. 3, May 2, 1942, page 1.

Moyer et al., Jr., Bacteriology, January 1946, pages 57 and 73.

---

Certificate of Correction

Patent No. 2,440,356.                                                                                    April 27, 1948.

OTTO K. BEHRENS

It is hereby certified that errors appear in the printed specification of the above numbered patent requiring correction as follows: Column 2, line 48, for "N-phenylacetyl-valine" read *N-phenylacetylvaline*; column 5, line 34, for "110" read *118*; column 6, line 7, for "N-phenylacetylavine" read *N-phenylacetylvaline*; column 7, lines 54 and 63, for "N-phenyl-acetylnor-valine" read *N-phenylacetylnor-valine*; line 60, for "1433" read *143*; column 8, line 2, for "c. of" read *cc. of*; column 11, line 16, for "to" after the numeral "10" read *or*; and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.* acetylvaline having the 1-configuration of the molecule.

6. A culture medium for the production of penicillin in submerged culture through the growth of a Penicillium mold of the notatum-chrysogenum group, said culture medium comprising nutrient material and an effective amount less than about one percent of a compound characterized by the presence of its 1-configuration isomer and selected from the class consisting of acids represented by the formula

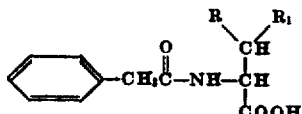

wherein R represents a member of the group consisting of hydrogen, ethyl and methyl and $R_1$ represents an alkyl radical having not more than two carbon atoms; and the salts and lower alkyl esters of said acids.

7. A culture medium for the production of penicillin in submerged culture through the growth of a Penicillium mold of the notatum-chrysogenum group, said culture medium comprising water, nutrient material and, in amount effective to accelerate the production of penicillin and less than about 1 percent, a compound characterized by the presence of its 1-configuration isomer and selected from the class consisting of acids represented by the formula

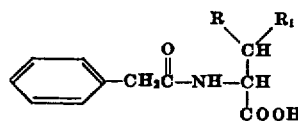

wherein R represents a member of the group consisting of hydrogen, ethyl and methyl and $R_1$ represents an alkyl radical having not more than two carbon atoms; and the salts and lower alkyl esters of said acids.

8. A culture medium for the production of penicillin in submerged culture through the growth of a Penicillium mold of the notatum-chrysogenum group, said culture medium comprising water, nutrient material dispersed in said water, and about 0.01 percent of N-phenylacetylvaline having the 1-configuration of the molecule.

OTTO K. BEHRENS.

REFERENCES CITED

The following references are of record in the file of this patent:

Coghill, Monthly Progress Report No. 16, November 20, 1943, Distributed by Committee on Medical Research, O. S. R. D., pages 1 and 2.

Pennsylvania State College Penicillin Interim Report (45-124), March 30, 1945, page 1.

Coghill, Monthly Progress Report No. 3, May 2, 1942, page 1.

Moyer et al., Jr., Bacteriology, January 1946, pages 57 and 73.

Certificate of Correction

Patent No. 2,440,356.

April 27, 1948.

OTTO K. BEHRENS

It is hereby certified that errors appear in the printed specification of the above numbered patent requiring correction as follows: Column 2, line 48, for "N-phenylacetyl-valine" read *N-phenylacetylvaline*; column 5, line 34, for "110" read *118*; column 6, line 7, for "N-phenylacetylavine" read *N-phenylacetylvaline*; column 7, lines 54 and 63, for "N-phenyl-acetylnor-valine" read *N-phenylacetylnor-valine*; line 60, for "1433" read *143*; column 8, line 2, for "c. of" read *cc. of*; column 11, line 16, for "to" after the numeral "10" read *or*; and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.*